A. A. STILLMAN.
STARTING MEANS FOR INTERNAL COMBUSTION ENGINES.
APPLICATION FILED MAY 23, 1910.
1,071,969. Patented Sept. 2, 1913.
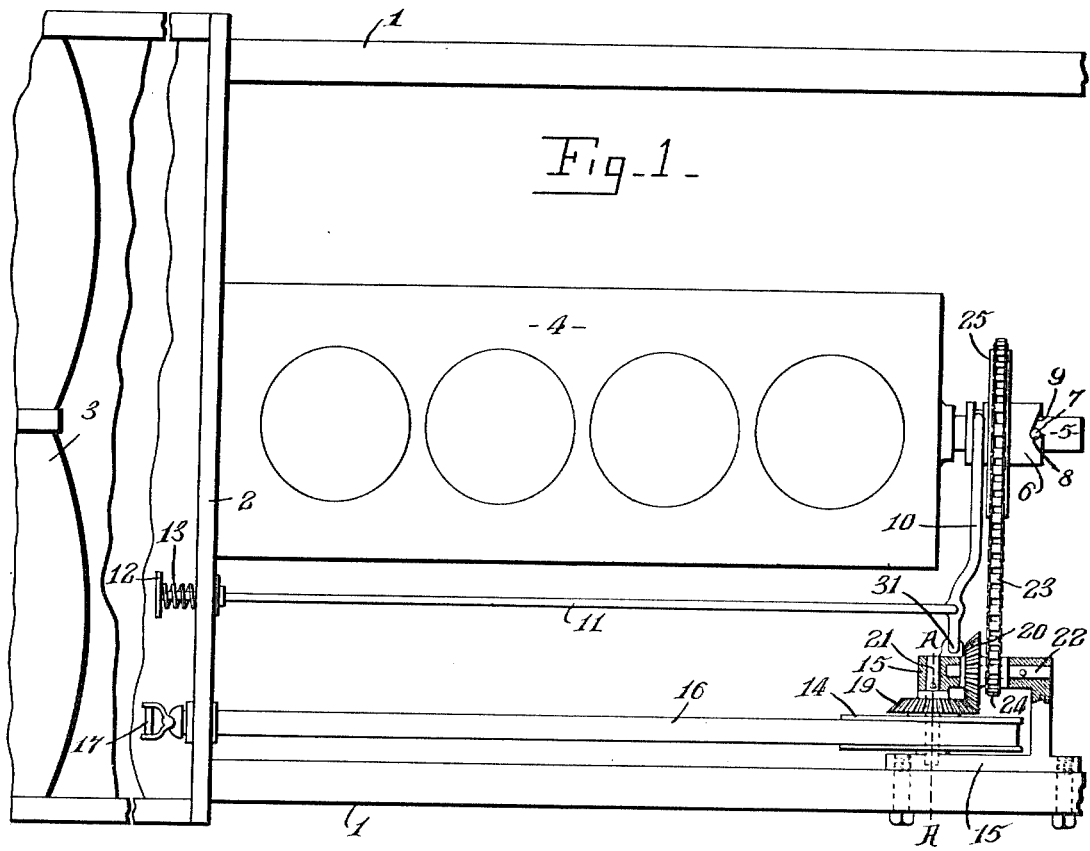
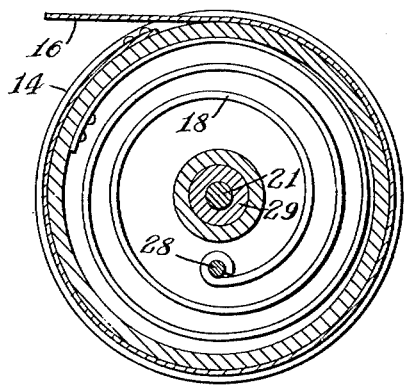
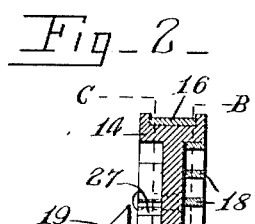
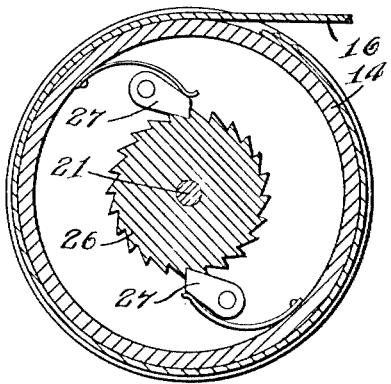
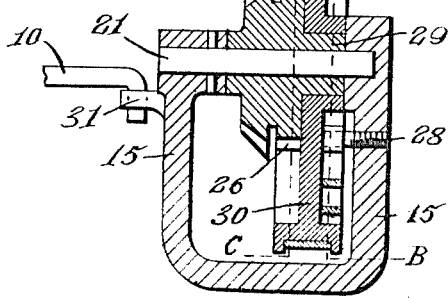
WITNESSES:
INVENTOR
Albert A. Stillman
BY
ATTORNEYS

UNITED STATES PATENT OFFICE.

ALBERT A. STILLMAN, OF SYRACUSE, NEW YORK.

STARTING MEANS FOR INTERNAL-COMBUSTION ENGINES.

1,071,969.  Specification of Letters Patent.  Patented Sept. 2, 1913.

Application filed May 23, 1910. Serial No. 562,807.

*To all whom it may concern:*

Be it known that I, ALBERT A. STILLMAN, of Syracuse, in the county of Onondaga and State of New York, have invented a certain new and useful Starting Means for Internal-Combustion Engines, of which the following is a specification.

My invention has for its object the production of a particularly simple and efficient means for starting, from the seat, the internal combustion engine of a motor vehicle; and it consists in the combinations and constructions hereinafter set forth and claimed.

In describing this invention reference is had to the accompanying drawing in which like characters designate corresponding parts in all the views.

Figure 1, is a top plan, partly broken away and parts being omitted, of a portion of a motor vehicle in which my invention is embodied. Fig. 2 is a sectional view on line "A—A" Fig. 1, parts being omitted. Figs. 3 and 4 are sectional views taken respectively on lines "B—B" and "C—C" Fig. 2, parts being omitted.

1 are the sills forming part of the frame of a motor vehicle; 2 is the dash-board, and 3 the seat thereof.

4 is the internal combustion engine of the motor vehicle, the engine being located in front of the dash-board and including a crank shaft 5.

6 is a member for starting the crank shaft 5, said member being here shown as a sleeve mounted on the crank shaft 5 and slidable axially thereon, the sleeve and the crank shaft being provided with means whereby the sleeve rotates the crank shaft in a forward direction to start the engine and the crank shaft rotates independently of the starting member or sleeve after the engine has been started.

As here shown the crank shaft is formed with a pin or shoulder 7 which is engaged by a shoulder 8 in the form of a notch provided at one end of the sleeve 6, and the sleeve 6 is also formed with an inclined or cam surface 9 which engages the pin 7 and causes the sleeve 6 to be shifted axially carrying the shoulder 8 or notch thereof out of engagement with the pin 7, such shifting of the sleeve 6 being effected by the forward rotation of the crank shaft when the engine is running by its own power.

The starting member or sleeve 6 is shifted to engage the shoulder 8 thereof with the pin 7 by means of a fork 10 engaging the sleeve 6 and a rod or link 11 connected to the fork and extending rearwardly through the dash-board 2 of the vehicle within reach of the seat 3. The link is provided with a head 12 at the rear of the dash-board, and a spring 13 encircling the link 11, is interposed between the dash-board 2 and the head 12 and serves to shift the starting member or sleeve 6 from its operative position, when such member or sleeve is not held in engagement with the pin 7 by force applied to the sleeve 6 tending to turn the crank shaft.

The means for operating the starting member includes a driving element connected to the starting member, a part connected to the driving element and extending through the dash-board 2 within reach of the seat 3 and operating to actuate the driving element in one direction, and means for actuating the driving element in the reverse direction.

In the illustrated embodiment of my invention, the driving element comprises a drum 14 carried by a support 15 secured to one of the sills 1 of the frame, power transmitting means between the drum and the starting member or sleeve 6, and a strap 16 winding on the drum and extending rearwardly through the dash-board and provided with a handle 17. By means of the strap the drum can be manually rotated in one direction. A spring 18 serves to rotate the drum in the opposite direction to wind up the strap. The power-transmitting means between the drum and the starting member or sleeve 6 includes clutch members, by means of which the drum is connected to the starting member or sleeve 6 when the drum is being actuated by the strap 16, and is free to move independently of such power-transmitting means when the drum is being actuated by the spring to wind the strap thereon. As here shown, such power-transmitting means comprises also bevel gears 19 and 20 mounted respectively on spindles 21 and 22, and a belt or sprocket chain 23 running over the sprocket wheels 24 and 25 provided respectively on the hub of the bevel gear 20 and on the sleeve or starting member 6. The spindles 21 and 22 are carried by the support 15 and are arranged at a right angle to each other, and the spindle 22 extends parallel to the crank shaft.

The clutch members consists of a ratchet wheel 26 and pawls 27 the ratchet wheel being integral with the hub of the bevel gear 19 and located within the drum 14, and the pawls 27 being carried by the drum and coacting with the ratchet wheel. The spring 18 actuating the drum to wind up the strap 16, is also located within the drum, one end being fixed to the drum and the other connected at 28 to the support 15. As here shown, the drum is mounted upon an extension 29 of the hub of the bevel gear 19 and is provided with a web 30 located about midway between its ends, and on opposite sides of which the pawls 27 and the spring 18 are located. Usually the fork 10 is pivoted at 31 to the support 15. In operation when it is desired to start the engine the driver presses the head 12 of the rod 11 with one hand or foot toward the dash-board shifting the starting member or sleeve into operative engagement with the pin 7 of the crank shaft and pulls the handle 17 with the other hand, in the meantime releasing the head 12. The pulling of the handle 17 obviously rotates the drum 14 and the movement thereof is transmitted to the crank shaft. The engine having been started, the pin 7, acting on the cam face 9 and also acting in conjunction with the spring 13 moves the starting member or sleeve 6 out of its operative position, and also the spring 18 rotates the drum in the reverse direction winding up the strap 16 for the next operation.

What I claim is:

1. In a motor vehicle including a frame and a dash-board, an internal combustion engine supported by the frame in front of the dash-board and having a crank shaft and mechanism for starting the engine including a member shiftable axially into and out of connection with the crank shaft, a support adapted to be attached to the frame of the vehicle at one side of the engine, a rotating member mounted in the frame and arranged with its axis at a right angle to the axis of the crank shaft, a drum mounted to rotate about the axis of said member, clutch members associated respectively with the rotating member and the drum and operating to permit the drum to actuate the rotating member in one direction, and the drum to rotate in the reverse direction independently of said member, flexible means winding on the drum and extending rearwardly within reach of the seat of the vehicle and serving to actuate the drum in one direction, a spring serving to actuate the drum in the reverse direction, and power-transmitting means between the rotating member and the starting member, substantially as and for the purpose specified.

2. In a motor vehicle including a frame, and a dash-board, an internal combustion engine supported by the frame in front of the dash-board, and having a crank shaft, and mechanism for starting the engine including a member shiftable into and out of connection with the crank shaft, a support mounted on the frame at one side of the crank shaft, and operating means for the starting member including spindles carried by the support and arranged with their axes at a right angle to each other, and one of the spindles extending parallel to the crank shaft, a drum movable about the axis of the other of said spindles, intermeshing bevel gears mounted respectively on said spindles, one being contiguous to the drum, clutch members associated respectively with the drum and the bevel gear contiguous to the drum and operating to permit the drum to drive said bevel gear in one direction, and the drum to rotate independently of the same in the reverse direction, power-transmitting means between the starting member and the bevel gear mounted on the spindle parallel to the crank shaft, a strap winding on the drum and extending rearwardly through the dash board of the vehicle, and a spring located within the drum and connected at one end to the support and at its other end to the drum, substantially as and for the purpose set forth.

In testimony whereof, I have hereunto signed my name in the presence of two attesting witnesses, at Syracuse, in the county of Onondaga, in the State of New York, this 9th day of May, 1910.

ALBERT A. STILLMAN.

Witnesses:
GENEVIEVE B. SMITH,
S. DAVIS.